FIG. 1

PETER M. KNAPP
DAVID MITTMAN
INVENTORS

ATTORNEY

PETER M. KNAPP
DAVID MITTMAN
INVENTORS

ATTORNEY

United States Patent Office 2,944,170
Patented July 5, 1960

2,944,170

ENCAPSULATING METHOD FOR SERVO SYSTEMS

Peter M. Knapp, Pequannock, and David Mittman, West Englewood, N.J., assignors to General Precision, Inc., a corporation of Delaware Filed Nov. 24, 1958, Ser. No. 775,991

11 Claims. (Cl. 310—89)

This invention relates to electro mechanical devices, and is particularly directed to mechanical and electro-mechanical devices, such as servo-mechanisms and systems and the like, in which a plurality of electro-mechanical components, such as servo motors, synchros and the like are supported on a common base or bases, and geared or otherwise operatively interconnected to one another to synchronize and co-ordinate the operation of the various components.

The invention is primarily directed to an encapsulating method, by means of which the various components in a servo system are covered and enclosed in such a manner as to form a unified physical unit, which, while it functions mechanically and electrically as a group of individual components, are enclosed and surrounded by the encapsulating material in such a manner as to present what is in essence, from an operating viewpoint, a single compact unit.

Where servo systems of this general tyye are used in aircraft, guided missiles, and the like, the overall weight of the assembled unit, and the space which it occupies are of critical importance in the operation of the vehicle.

The various components in the servo systems, which are individually relatively small and relatively light, are mounted and coupled in such a manner, that the space between adjacent components is frequently extremely small.

Due to the extremely high speeds of modern military aircraft, and missiles of various types, and the extreme accelerations to which they are subjected by rocket propelled power plants, and other types of power units, in which high explosive forces are utilized to accelerate the vehicle from rest to an extremely high velocity in a relatively short time interval, these servo systems are frequently subjected to extreme shock loads.

As these servo systems are utilized in various phases of the guidance and control mechanisms of the missile, or other type of vehicle, it is essential that the accuracy of the various components and that of the combined system be maintained regardless of the speed of the vehicle, and the acceleration to which it is subjected.

Another problem presented is that due to the high rotational speeds of the servo motors and some of the other servo components used, a substantial amount of heat is generated in these components, during the operation thereof, so that it is essential that a major portion of the heat generated be removed from the units and dissipated as rapidly as possible, in order to maintain the operating temperature of the individual components at reasonable levels at all times.

The fit and operating clearance of the gears used in servo systems of this type, are also held to a high degree of accuracy in order to reduce the error of transmission from one component to another to a minimum.

While encapsulating methods and materials of various types have been in use in this type of servo system for some time, they have presented many problems due to increased weight, the distortion of the various components during the encapsulating process, the rate of heat transmission through the encapsulating material, and the difference in the rate of expansion between the encapsulating material, and the material of which the various components of the system are made.

The primary feature of the invention is that a relatively thin boot, or shell made of a flexible material, which is molded or otherwise fabricated to a size approximately that of, and usually slightly smaller than the stator dimensions of the exposed portion of the servo components, is fitted to the various servo components, to serve as a retainer and separator, after which the outer encapsulating material, in the form of a foamed plastic material, is poured into the clear area between the outer surface of the shell, and the inner surface of a mold, which determines the outer dimensions of the assembled encapsulated unit.

A primary feature of the construction is that the inner shell, after it is fitted to the static parts of the various servo components, protects the gears and other moving parts of the unit while the encapsulating material is deposited around the shells. In order to assure completely filling the area between the inner surfaces of the mold, and the outer surfaces of the shell, and to eliminate air bubbles in the encapsulating material, the air is evacuated from the encapsulating area, prior to filling with encapsulating material.

Another feature is that the shell, or boot, which is made of silicone rubber, is pre-molded to substantially the outer contour of the static parts of the various servo components, the perimeter of the shell, as molded, being about 10% or thereabouts under the perimeter of the surfaces of the components to which the shell is fitted, so that in fitting it to the various servo components, the shell is stretched over them to some extent, thus providing a tight, accurate fit around the outer surfaces of the servo components, which engage the inner surfaces of the shell.

Another feature of the construction is that the heat conductivity of the encapsulating materials employed is compatible with that of the material of which the various components are made, so that the heat generated within the components is uniformly distributed and dissipated through the encapsulating material.

Another feature of the construction is that a foamed plastic material is utilized for the encapsulating, thus reducing the weight of the encapsulating material to a minimum.

Another feature of the process employed is that after the encapsulating process is completed, the static parts of the various components form what is in essence a single compact unit, the individual components tending to reinforce one another, so that the assembled encapsulated unit can withstand a higher degree of vibration, and greater shock loads than the individual components incorporated in the encapsulated unit.

Another feature of the construction is that the thin shell protects the various servo components, so that the encapsulating material can be completely removed from the various components, thus enabling the components to be serviced and repaired, after which the shell can be replaced and new encapsulating material deposited in the encapsulated area, in substantially the same manner as in the original encapsulating process.

The accompanying drawings, illustrative of one embodiment of the invention, and several modifications thereof, together with the description of their construction and the method of mounting, fitting, co-ordination and utilization thereof, will serve to clarify further objects and advantages of the invention.

It will be understood that the following description of the construction and the method of mounting, fitting, and utilization of the encapsulating method for servo system, is intended as explanatory of the invention and not restrictive thereof.

In the drawings, the same reference numerals designate the same parts throughout the various views, except where otherwise indicated.

Figure 1:
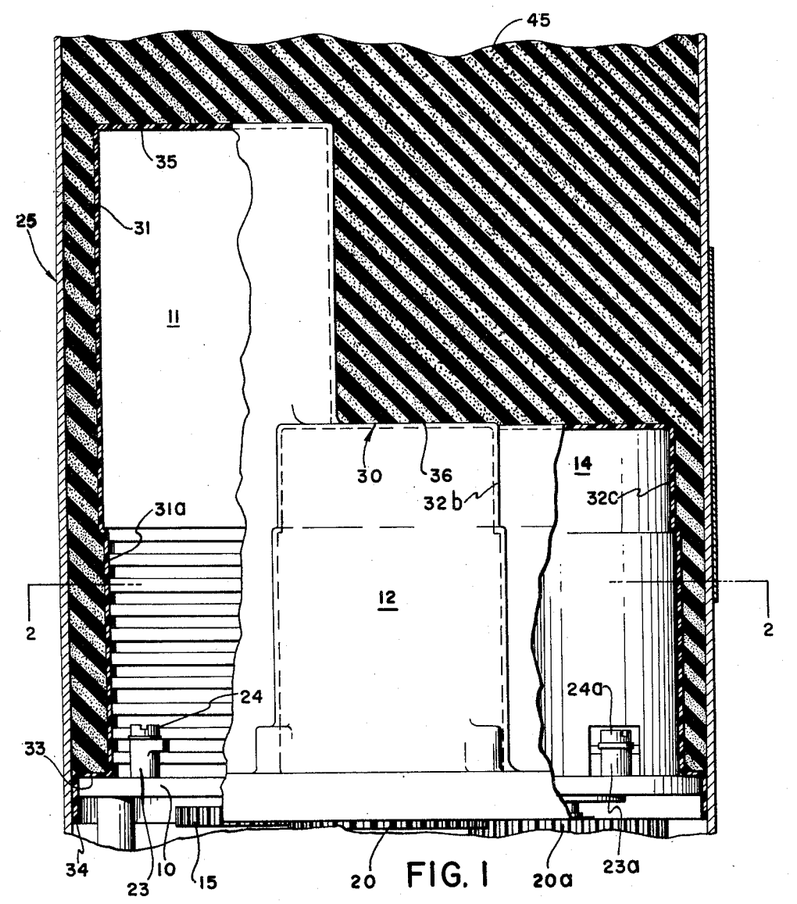
Figure 1 is a partial vertical section and partial front elevational view of the servo system, shown in Figure 4, mounted on a base plate, showing the protective shell fitted to the outer surfaces of the servo motor and the auxiliary servo components, and the encapsulating material deposited between the outer surfaces of the protective shell and the inner surface of the housing.
Figure 2:
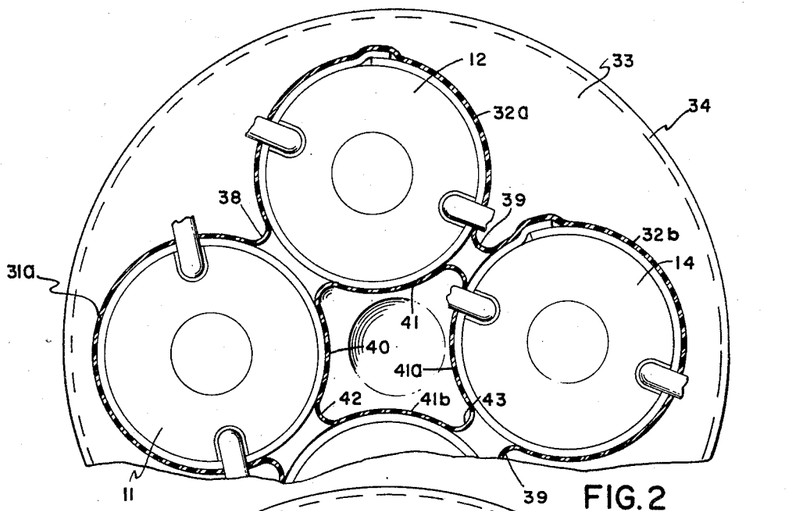
Figure 2 is a partial cross-section and partial plan view of the encapsulated servo system, shown in Figure 1, showing the servo motor and the auxiliary servo components, with portions of the protective shell fitted to the circumferential outer surfaces of the servo components, the encapsulating material having been eliminated for purposes of clarity; the section being taken on the line 2—2, Figure 1.
Figure 4:
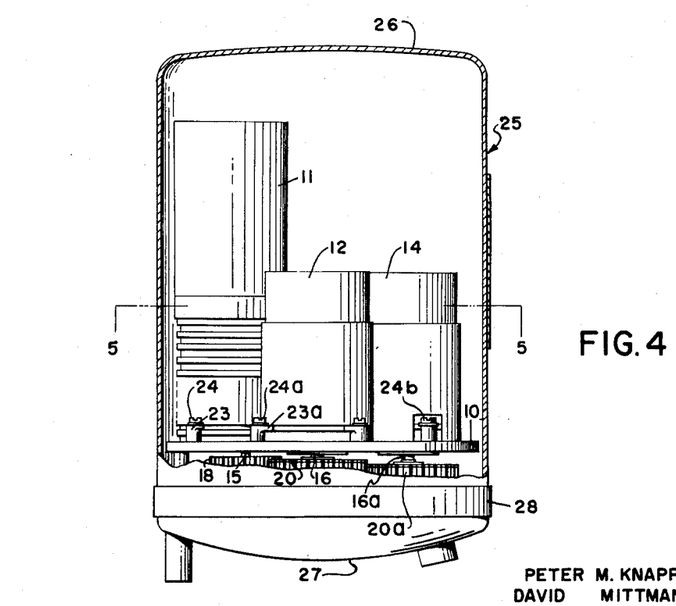
Figure 4 is a partial vertical section and partial front elevational view of the servo motor and other servo components shown in Figure 1, with the protective shell, and the encapsulating material eliminated, showing the base plate, and the planetary gear train mounted below the base plate, the section being taken on the line 4—4, Figure 5.

One embodiment of the construction, shown in Figures 1 and 2, which is mounted on a relatively flat base plate 10, comprises a geared servo motor 11, supported by the base plate 10, and a series of auxiliary servo components 12, 12a and 14, supported by the base plate 10, the axes of the servo components 12, 12a and 14 being substantially parallel to the axis of the servo motor 11. The servo motor 11 has a rotating shaft 15 projecting through the base plate 10, beyond the lower end of the geared end of the servo motor, each of the other components 12, 12a, and 14 having a similar shaft 16, 16a, 16b projecting beyond the lower end thereof, as shown in Figure 4, the shafts 16, 16a, 16b being substantially parallel to the axis of the servo motor shaft 15. A drive gear 18 is fitted to the shaft 15 of the servo motor and fastened thereto, by means of a clamp which clamps the hub of the drive gear 18 to the shaft of the servo motor, as shown in Figures 1 and 4.

The shaft of each of the other servo components 12, 14, also has a gear 20, 20a, attached thereto, the gears 20, 20a, meshing with one another, and being driven by the gear 18 attached to the servo motor shaft 15, to form a planetary gear train, which drives the various servo components at their required speeds, the respective pitch diameters of the gears 18, 20, 20a determining the speeds of the shafts of the various components in the usual manner.

Figure 5:
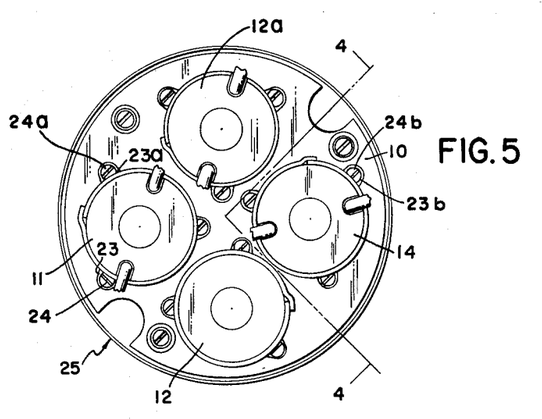
Figure 5 is a plan view, similar to Figure 2, of the servo motor and the auxiliary servo components shown in Figure 4, with a portion of the housing removed, showing the base plate and the method of attaching the servo components to the base plate.

Each of the gears 18, 20, 20a, is attached to the shaft 15, 16, 16a of the respective servo component, by a clamp or other suitable attaching or clamping means. The stator of the servo motor 11, and the stators of the various servo components 12, 12a, 14, used in conjunction therewith, are fastened to the base plate 10, by a plurality of radially positioned clamps 23, 23a, 23b, each of the clamps being attached to the base plate 10 by means of a screw 24, 24a, 24b, in the manner shown in Figures 1, 4 and 5.

The entire unit is surrounded by a hollow substantially circular housing 25, including a hollow relatively thin-walled tubular outer wall of substantially circular cross-section, the housing having a substantially circular top wall 26 integral with the upper end thereof, the open end of the housing having a dished cap 27 fitted thereto, the cap having a circular pilot integral with the open end thereof, the pilot fitting into the open end of the housing 25.

A seal strip 28, in the form of a thin sheet metal strip, is wrapped around the open end of the housing 25, and the adjoining end of the cap 27, the seal strip being soldered, or otherwise attached to the outer circumference of the housing 25, and the adjoining outer circumference of the cap 27, which is fitted thereto.

Figure 6:
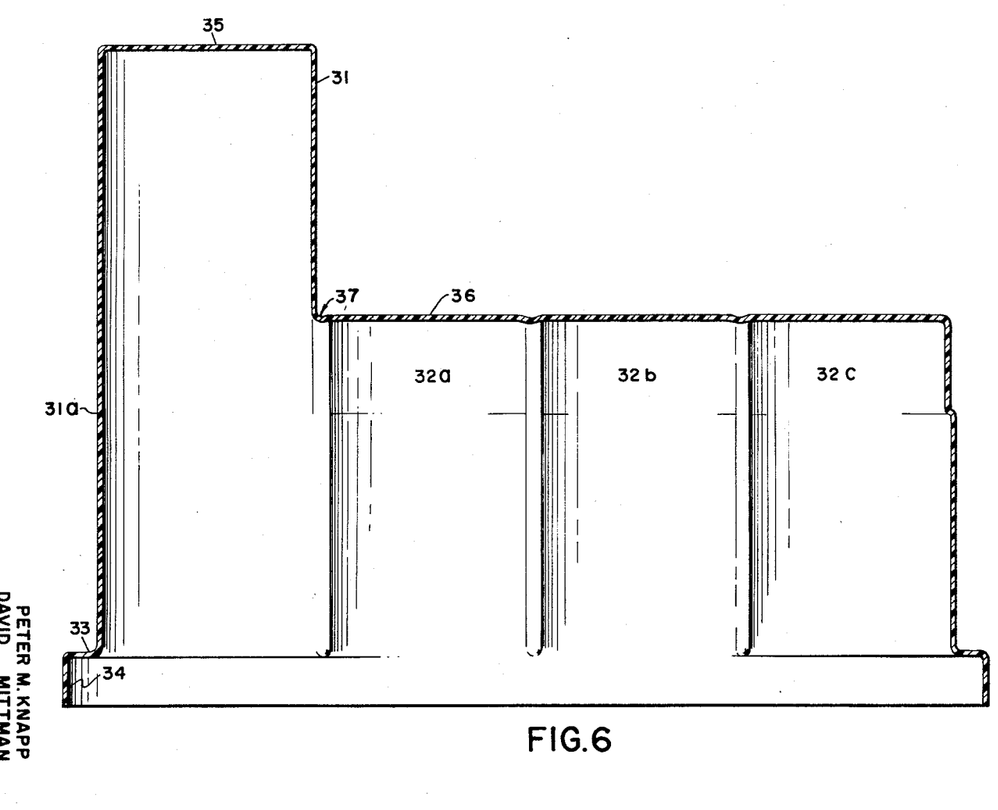
Figure 6 is a stretch-out section through the protective shell, substantially as shown in Figures 1 and 2, showing the hollow cylindrical section, which is fitted to the outer surfaces of the servo motor, and the hollow circular segmental sections, which are fitted to the circular segmental outer surfaces of the auxiliary servo components, shown in Figures 1 and 2.

The encapsulating method includes the fitting of a relatively thin pliable premolded shell 30, made of a silicone rubber, or other suitable pliable plastic material, to the outer surfaces of the servo motor 11, and the other servo components 12, 12a and 14 of the servo system, as shown in Figures 1, 2 and 6.

The shell 30, which is molded in one piece of silicone rubber, or other pliable plastic composition, is formed in several integral sections of circular segmental cross-section, as shown in Figures 1 and 2, one embodiment of the shell, which is shown in Figures 1, 2 and 6, including a hollow substantially cylindrical section 31, which is fitted to the upper projecting portion of the servo motor. A lower circular segmental section 31a, which is of hollow circular segmental cross-section, forms an extension of a portion of the hollow cylindrical section 31, which may be of substantially the same diameter as the hollow cylindrical upper section, or stepped and of a diameter somewhat smaller than the cylindrical upper section, as shown in Figure 1, the circular segmental section 31a being fitted to the lower portion of the outer surface of the servo motor 11. A series of additional circular segmental sections 32a, 32b, 32c, are fitted to a portion of the outer surface of the three auxiliary servo components 12, 12a and 14, the lower end of circular segmental sections being blended into a relatively flat base section 33, which engages the upper surface of the base plate 10, a substantially circular rim 34, integral with the base section, and substantially perpendicular thereto, being fitted around the outer circumference of the base plate 10, to grip the base plate and seal the interior of the shell 30. The upper end of the hollow cylindrical section 31 of the shell has a substantially circular top 35 integral therewith, the top resting against the upper surface of the servo motor 11, as shown in Figures 1 and 6. Where the auxiliary components 12, 12a and 14, are all of substantially the same height, as in the construction shown in Figures 1 and 6, an auxiliary top section 36, following substantially the circular segmental outer contour of the three auxiliary servo components 12, 12a and 14, is integral with the upper end of the circular segmental outer walls of the shell. In the construction shown in Figure 6, a fillet 37 is formed between the outer wall of the cylindrical section 31, of the shell, and the auxiliary top section thereof. In the construction shown in Figures 2 and 6, a fillet 38 is formed between the circular segmental outer wall of the circular segmental section 31a, which surrounds a portion of the servo motor 11 and the mating substantially circular segmental sections 32, 32c, each of which surrounds a portion of the outer walls of one of the auxiliary components 12, 12a, and a similar pair of fillets 39, the wall thickness of which is substantially the same as that of the other portions of the protective shell 30, which are formed at the junction between the circular segmental sections 32a, 32b, 32c, which surround a portion of the outer surface of the auxiliary components 12a, 14, as shown in Figure 2.

As shown in Figure 2 a central cavity is formed at the center, between the sections of the shell in engagement with outer surfaces of the other servo components, a relatively short circular segmental area 40 of the shell engaging a portion of the servo motor, and additional relatively short circular segmental areas 41, 41a, 41b engaging the adjacent portions of the auxiliary servo components 12, 12a and 14, a series of fillets 42 being formed between the circular segmental area 40 engaging the servo motor, and the adjacent segmental areas 41, 41b, engaging the outer surfaces of the adjacent servo components, with additional fillets 43, formed between the segmental areas engaging the auxiliary servo-components 12, 12a, and 14.

In molding the shell 30, the diameters of the circular section 31, and the circular segmental sections 31a, 32a, 32b of the shell, are made somewhat smaller than the outer diameter of the servo motor 11 and the auxiliary servo components 12, 12a, 12b, respectively, to enable the shell sections to be stretched over the outer circumference of the servo motor 11, and those of the auxiliary servo components 12, 12a, and 14, which are shown in Figure 2.

This applies also, to some extent, to the central circular segmental sections 40, 41, 41a and 41b, which surround the central cavity shown in Figure 2, between the various servo-components.

The difference between the perimeter of the various circumferential sections of the shell, and that of the adjoining surfaces of the auxiliary servo components 12, 12a, and 14, as well as the difference between the circumference of the hollow circular portion 31 of the shell, relative to the circumference of the servo motor, and other factors which enter into the degree of stretch to which the shell is subjected in assembling it to the outer surfaces of the servo motor and the other servo components, would depend to a great extent upon the overall size of the shell, the thickness of the material of which the shell is made, the elastic characteristics of the plastic molding material of which the shell is made, and the overall height of the servo-motor, together with the height of the auxiliary servo components, which determine the depth, or the distance through which the shell is stretched in order to fit it to the outer surface of the servo motor and the auxiliary servo components, in the position shown in Figures 1 and 2.

Generally, the degree of stretch around the circumferential surfaces of the servo motor and the auxiliary servo components would be of the order of about 10% of the circumferential length or perimeter, but this would depend to some extent upon the other factors hereinbefore outlined.

The height of the various sections of the shell would be substantially equal to the height of the servo motor and the other servo components fitted to it, as no stretch is generally necessary in this direction.

If anything, the height of the shell section between the base section 33 thereof, and the corresponding upper section, would be somewhat greater than the corresponding height of the servo motor 11 or the auxiliary servo components, to provide for the contraction, which would in all probability take place in this direction due to the expansion of the perimeter of the shell.

After the shell 30 is fitted to the outer surface of the servo motor 11 and the other servo components, in the position shown in Figures 1 and 2, the assembled unit is placed in a sealed mold, the inner surface of which follows substantially the inner contour of the housing 25. While the unit is mounted in a sealed mold, the air from the interior of the mold, including the area of the mold surrounding the shell 30, is evacuated, and a partial vacuum formed in the mold, between the interior of the mold surface, and the outer surface of the shell 30, the air being evacuated in the direction of the base plate 10.

After the vacuum is formed, the area between the inner surface of the mold, and the outer surface of the shell 30, is filled with a foamed epoxy resin 45, or other foamed plastic material, the foaming tending to reduce the weight of the encapsulating material.

After molding, the encapsulating material is hardened and dried, either within the mold, or the assembled unit may be removed from the mold after it is partially hardened, and hardened outside the mold, to form an encapsulated assembly, which follows the contour of the interior of the housing 25, above the base plate 10.

During the process of hardening, the encapsulating material 45 shrinks to some extent, so that it firmly grips the outer surfaces of the shell 30, and the servo motor, and the auxiliary components surrounded by the shell.

Figure 3:
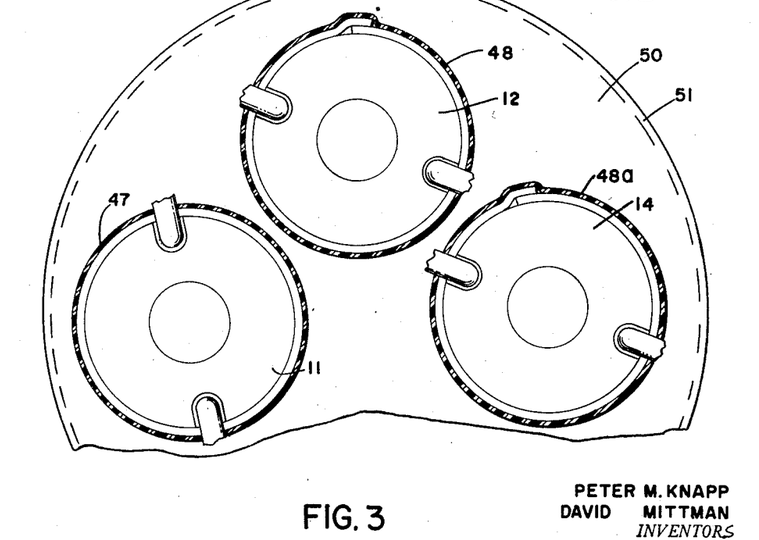
Figure 3 is a partial cross-section and partial plan view of the servo components in the servo system shown in Figure 2, showing a section through a modification of the protective shell, as shown in Figure 7, the hollow cylindrical sections of the shell completely surrounding the circumferential outer surfaces of the servo motor and the other servo components, the section being taken on a line similar to the line 2—2, Figure 1.
Figure 7:
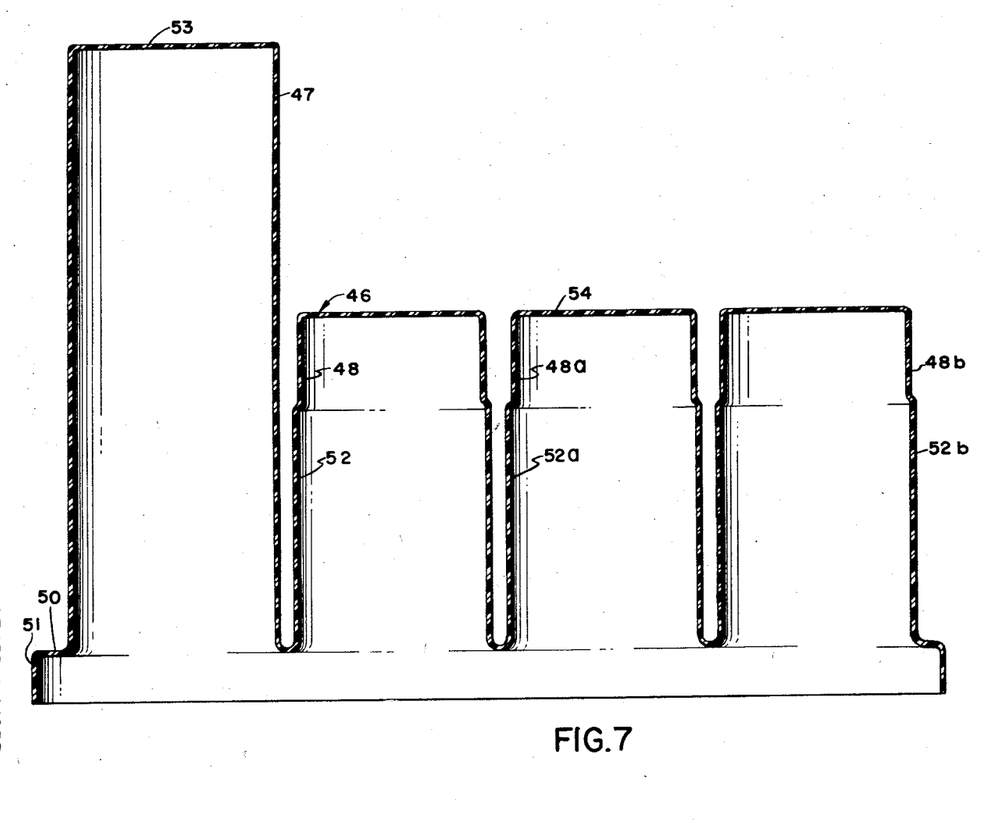
Figure 7 is a stretch-out section of the modified shell construction shown in Figure 3, showing the hollow cylindrical section, which is fitted to the outer surfaces of the servo motor, shown in Figures 1 and 3, and the individual hollow cylindrical sections fitted to the outer surfaces of the individual auxiliary servo components, shown in Figures 1, 3 and 4.

In place of the shell construction, shown in Figures 1 and 2, a modified type of shell 46, such as that shown in Figures 3 and 7, may be substituted.

This modified shell includes a hollow substantially cylindrical section 47, which is of circular cross-section, and fitted to the outer surface of the servo motor 11, in substantially the same manner, as that shown in Figure 1.

An additional thin-walled hollow cylindrical section 48, 48a, of substantially circular cross-section may be fitted to each of the auxiliary components 12, 12a, and 14.

The lower end of the hollow cylindrical sections 47, 48, of the shell, are integral with and blended into a flat base section 50, as shown in Figure 7, which is located adjacent the upper surface of the base plate 10 of the unit, in substantially the same manner as that shown in Figure 1, a substantially circular rim, or skirt 51, integral with the outer edge of the base section, and substantially perpendicular thereto, being fitted around the outer circumference of the base plate, to grip the base plate and seal the interior of the modified shell 46, above the base plate. The lower end of the rim, or skirt, extends beyond the lower end of the base plate 10, this portion being folded flat against the bottom surface of the base plate, and glued or otherwise attached thereto, in order to positively attach the shell to the base plate 10.

Where the outer surfaces of the auxiliary components 12, 12a, 14, of the servo system are stepped slightly, the inner diameter of each tubular section 48, 48a, 48b, fitted to each of the auxiliary components 12, 12a, 14, is similarly stepped, the diameter of the lower section 52, 52a, 52b, of each of the tubular sections of the modified shell being somewhat greater than that of the upper tubular sections 48, 48a, 48b, thereof.

The upper end of the tubular section 47 of the shell, which is fitted to the servo-motor 11, has a flat substantially circular top 53, integral therewith, in substantially the same manner as that shown in Figures 1 and 6, a similar flat top 54 being integral with each of the hollow cylindrical sections 48, 48a, 48b, of the modified shell, which is fitted to the corresponding auxiliary component of the servo system, in substantially the same manner as those shown in Figures 1 and 6.

The modified shell 46, shown in Figures 3 and 7, is molded in one piece of a silicone rubber composition, or other suitable pliable plastic material, in substantially the same manner as that shown in Figures 1 and 6, the walls of the various sections of the modified shell being relatively thin and substantially uniform in thickness.

A small fillet is formed at the bottom junction between each of the lower hollow cylindrical sections 52, 52a, 52b, of the modified shell, and the flat base section 50 thereof, in substantially the same manner as those shown in Figures 1 and 6.

In order to utilize the modified shell construction, shown in Figure 7, it is essential that the spacing between adjacent edges of the outer circumference of the various components of the servo system be sufficiently large as to allow for two wall thicknesses of the shell, plus an additional space thick enough to allow a section of the mold, located between the outer surfaces of adjacent cylindrical sections of the shell wall, to support the outer surfaces of the circumferential walls of the shell.

In molding the modified shell, shown in Figures 3 and 7, the diameter of the hollow cylindrical section 47 fitted to the servo motor and the auxiliary hollow cylindrical sections 48, 48a, 48b, as well as the lower hollow cylindrical section 52, 52a, 52b, thereof, fitted to the auxiliary components 12, 12a, 14, are reduced to some extent, relative to the diameter of the components to which they are fitted. In view of the fact that each of the hollow cylindrical sections of the shell is accurately fitted to the outer circumference of one of the cylindrical servo components, the reduction in diameter to allow for stretching of the shell sections would be somewhat less than that of the sections of the shell shown in Figures 1 and 6.

In the modified shell construction shown in Figure 7, the reduction in diameter would be such as to allow for a circumferential stretch of the order of 10% or less, relative to each of the servo components to which a particular hollow cylindrical section is fitted. The height of each of the hollow cylindrical sections of the modified shell, from the bottom surface of the base 50, to the inner surface of the top of a particular hollow cylindrical section, would be substantially equal to the height of the servo motor 11, or other auxiliary servo component, to which a hollow cylindrical section of the shell is fitted, as no stretching of the modified shell is necessary in this direction.

It is also quite probable that the height of the shell section 47 fitted to the servo motor, and the heights of the auxiliary sections 48, 48a, 48b, fitted to the auxiliary servo components 12, 12a, 14, would be increased somewhat, over the heights of the servo motor 11, and the auxiliary servo components, to which they are fitted, to allow for some contraction in height, which would normally accompany the circumferential expansion, in substantially the same manner as the shell shown in Figure 6.

The degree of contraction in height would depend upon the type of material used in the shell, the thickness thereof, and the extent of the circumferential stretch of the various hollow cylindrical sections 47, 48, 48a, 48b, which is provided for.

The diameter of the rim section, located adjacent the base section 50 of the shell, would also be reduced over the outer diameter of the base plate, to allow for a circumferential stretch of the order of about 10%, between the inner circumference of the rim 51, of the modified shell 46, and the outer circumference of the base plate 10, to which it is fitted, to provide a tight fit and positive seal around the base plate 10.

The differential between the diameters of the various hollow cylindrical sections of the modified shell, and the various components to which they are fitted, and between the diameter of the rim of the modified shell and the base plate to which it is fitted, would depend upon the diameter of the individual cylindrical section of the shell, the thickness of the material and the texture, composition and elasticity of the material of which a particular modified shell is made, as well as the ratio between the diameter of each of the hollow cylindrical sections and the height thereof, so that the actual stretch allowed for, in a particular shell, would primarily be determined experimentally, to allow for all of the various factors which affect it to a greater or less extent.

In some instances, where there are extreme variations in diameter, between the servo motor and the auxiliary servo components, and the height of the servo motor 11 and those of the auxiliary servo components, the degree of stretch allowed for could be varied to some extent, even in an individual modified shell, between one hollow cylindrical section fitted to the servo motor of the servo unit, and those fitted to the auxiliary servo components.

After the modified shell 46 is fitted to the outer surface of the servo motor 11, and those of the auxiliary servo components 12, 12a, 14, in substantially the position shown in Figures 1 and 3, the assembled unit is placed in a sealed mold, in substantially the same manner as that shown in Figures 1 and 2. While the servo unit with the modified shell 46 fitted thereto, is mounted in the sealed mold, the air is evacuated from the interior of the mold, in substantially the same manner as that shown in Figures 1 and 2, and a partial vacuum formed within the mold.

After the vacuum is formed, the area between the inner surface of the mold and the outer surface of the modified shell 46 is filled with a foamed epoxy resin 45, in substantially the same manner as that shown in Figures 1 and 2.

The encapsulating material is hardened to the required shape and contour, after which the hollow tubular housing 25 is fitted to the outer surface of the encapsulating material, and the rim of the shell 46, in the same manner as that shown in Figure 1, the bottom cap 27 being fitted to the housing, and the seal strip 28, wrapped around the open end of the housing, and the adjoining end of the cap 27, the seal strip being soldered, or otherwise attached to the outer circumference of the housing, and the outer circumference of the cap, in substantially the same manner as that shown in Figures 1 and 4.

It will be apparent to those skilled in the art, that the present invention is not limited to the specific details described above and shown in the drawings, and that various modifications are possible in carrying out the features of the invention and the operation and the method of support, fitting and utilization thereof, without departing from the spirit and scope of the appended claims.

What is claimed is:

1. In combination with a servo system, including a servo motor and a plurality of auxiliary servo components mounted substantially parallel to the servo motor, with a base plate supporting the servo motor and the auxiliary servo components, said servo motor and the auxiliary servo components each having a rotatable shaft incorporated therewith and projecting through the base plate, and means attached to the rotatable shaft of each of said servo components adapted to transfer the rotation of the shaft of the servo motor to the shafts of the auxiliary servo components, a relatively thin hollow shell formed of a pliable, readily expansible plastic material, fitted to the outer surfaces of the portion of the servo motor and the auxiliary servo components projecting above the base plate, said hollow shell having a base section integral therewith adapted to engage the surface of the base plate directed toward the projecting portion of the servo components, a portion of the shell extending beyond the base section thereof being adapted to be fitted around the base plate, said shell being adapted to completely enclose the projecting portion of the servo motor and the auxiliary servo components, supported by the base plate.

2. A hollow shell for use in combination with a servo system, as in claim 1, in which the hollow shell is molded of a flexible silicone rubber composition.

3. A shell for use in combination with a servo system, as in claim 1, in which the hollow shell is molded of an expansible plastic material, the perimeter of the cross-sectional contour of the hollow shell, in a plane substantially perpendicular to the axes of the servo components, being smaller than the perimeter of the corresponding outer surfaces of the projecting portion of the servo components to which the hollow shell is fitted, the hollow shell being adapted to be stretched over the projecting portion of the servo components, when it is fitted thereto.

4. A shell for use in combination with a servo system, as in claim 1, in which the shell includes a plurality of hollow substantially cylindrical sections, one of said hollow cylindrical sections being adapted to be fitted around the outer surface of the portion of the servo motor projecting above the base plate, each of the other hollow cylindrical sections being adapted to be fitted to the outer surface of the portion of one of the auxiliary servo components, projecting above the base plate, the open end of each of said hollow cylindrical sections being integral with the base section of the hollow shell, the circumference of the inner surface of each of the hollow cylindrical sections being smaller than the outer circumference of the cylindrical portion of the servo component to which it is fitted, the upper end of the hollow cylindrical section fitted to the servo motor having a substantially circular top section integral therewith, the top section being adapted to engage the upper end of the servo motor, each of the hollow cylindrical sections of the shell, adapted to be fitted to each of the auxiliary servo components, having a substantially circular top section integral therewith, each of said top sections being adapted to engage the upper end of the mating auxiliary servo component.

5. In combination with a plurality of substantially cylindrical servo components, radially spacedly located relative to one another and substantially parallel to one another, and a base plate attached to and supporting said servo components, each of said servo components having a rotatable shaft incorporated therewith, said rotatable shafts extending through the base plate, and means fitted to each of said rotatable shafts adapted to transmit the rotation of the shaft of one of the servo components to the shafts of the others, a hollow housing, following substantially the contour of the outer surface of the base plate surrounding the base plate and the servo components supported thereby, and means attached to the open end of the hollow housing adapted to seal the interior of the hollow housing, a premolded hollow shell of a thin pliable plastic material fitted around the outer surfaces of the portion of the servo components projecting above the base plate, a portion of the shell being fitted around the base plate to seal the interior of the hollow shell, the portion of the area within the outer housing, between the outer surface of the hollow shell surrounding the servo components and the interior of the housing, being filled with a foamed plastic encapsulating material.

6. An encapsulated servo system, as in claim 5, in which the premolded hollow shell is molded of a pliable silicone rubber composition, the encapsulating material between the outer surface of the hollow shell and the inner surface of the hollow housing being a foamed epoxy resin.

7. A hollow shell for use in combination with a servo system, as in claim 6, in which the hollow shell is molded of a relatively thin expansible plastic material, the perimeter of the cross-sectional contour of the inner surface of the shell, in a plane substantially perpendicular to the axes of the servo components, being smaller than the perimeter of the corresponding outer surfaces of the servo components to which the hollow shell is fitted, the shell being adapted to be stretched over the servo components when it is fitted thereto, the hollow shell having a multiple top section following the cross-sectional contour of the body of the shell integral therewith, the multiple top section being adapted to engage the upper surfaces of the servo components to which the hollow shell is fitted, the shell including a base section integral with the lower portion of the shell, and substantially perpendicular thereto, the base section being adapted to engage the adjacent surface of the base plate, and a rim integral with the base section and substantially perpendicular thereto, the rim following the contour of the outer surface of the base plate, the rim being adapted to be attached to the base plate, to seal the interior of the hollow shell.

8. A hollow shell for use in combination with a servo system, as in claim 5, in which the hollow shell is molded of an expansible rubber composition, the perimeter of the cross-sectional contour of the inner surface of the shell, in a plane substantially perpendicular to the axes of the servo components, being smaller than the perimeter of the corresponding outer surfaces of the servo components to which the hollow shell is fitted, the shell being adapted to be stretched over the portion of the servo components projecting beyond the base plate, when the shell is fitted thereto, the hollow shell having a multiple top section following substantially the cross-sectional contour of the hollow shell integral therewith, the multiple top section being adapted to engage the upper surfaces of the servo components to which the hollow shell is fitted.

9. In combination with a plurality of servo components, as in claim 5, in which one of the servo components is a servo motor of substantially cylindrical form, supported by the base plate, the servo motor being higher relative to the base plate than the other servo components, the hollow shell being molded of an expansible rubber composition, the portion of the hollow shell, adapted to be fitted to the portion of the servo motor extending above the top of the other servo components, being of substantially hollow cylindrical form, the portion of the hollow shell located below the hollow cylindrical portion thereof, being formed of a plurality of interconnected sections of circular segmental cross-section, in a plane substantially perpendicular to the axes of the servo components, with a circular segmental fillet integral with and connecting each adjacent pair of circular segmental sections, the circumference of the inner surface of the hollow cylindrical portion of the shell, surrounding the projecting upper portion of the servo motor, being smaller than the circumference of the section of the servo motor to which it is fitted, the perimeter of the cross-sectional contour of the inner surface of the hollow shell, in a plane substantially perpendicular to the axes of the servo components, being smaller than the perimeter of the corresponding outer surfaces of the servo motor and the other servo components, to which the hollow shell is fitted, the hollow shell being adapted to be stretched over the portion of the servo motor and the other servo components, projecting beyond the base plate, when the hollow shell is fitted thereto, the hollow cylindrical section of the shell, surrounding the servo motor, having a substantially circular top section integral therewith, the top section being adapted to engage the upper surface of the servo motor, the composite circular segmental sections of the hollow shell, in engagement with the auxiliary servo components, having a multiple top section following substantially the contour of the cross-sectional contour of the circular segmental sections of the shell integral therewith, the multiple top section being adapted to engage the upper surfaces of the auxiliary servo components, to which the hollow shell is fitted, the hollow shell including a base section integral with the lower portion thereof, and substantially perpendicular to the axes of the circular segmental sections thereof, the base section being adapted to engage the surface of the base plate directed toward the servo components.

10. In combination with a plurality of servo components, as in claim 5, in which one of the servo components is a servo motor, the portion of the servo motor projecting above the base plate being of substantially cylindrical form, the servo motor being supported by the base plate, in which the hollow shell includes a plurality of hollow substantially cylindrical sections, each of the hollow cylindrical sections being adapted to be fitted to the projecting outer surface of one of the servo components, the open end of the hollow cylindrical sections of the hollow shell having a base section integral therewith, the base section being adapted to engage the surface of the base plate directed toward the cylindrical sections of the servo components, the circumference of the inner surface of each of the hollow cylindrical sections being smaller than the outer circumference of the servo component to which it is fitted, the hollow shell being adapted to be stretched over the portion of the servo components projecting beyond the base plate, when the shell is fitted thereto, the upper end of each of the hollow cylindrical sections of the shell having a substantially circular top section integral therewith, each top section being adapted to engage the upper end of the mating servo component, the shell including a base section integral with the open lower end of the hollow cylindrical sections thereof, and substantially perpendicular to the axes of the hollow cylindrical sections of the servo components, the base section being adapted to engage the surface of the base plate directed toward the servo components.

11. In combination with a plurality of servo components, as in claim 5 in which one of the servo components is a servo motor, the portion of the servo motor projecting above the base plate being of substantially cylindrical form, the servo motor being supported by the base plate, the servo motor being higher relative to the base plate, than the other servo components, the hollow shell being molded of an expansible rubber composition, the shell including a plurality of hollow substantially cylindrical sections, one of said hollow cylindrical sections being adapted to be fitted to the outer surface of the projecting portion of the servo motor, each of the other hollow cylindrical sections being adapted to be fitted to the outer surface of the projecting portion of one of the auxiliary servo components, the open end of the hollow cylindrical sections having a substantially flat base section integral therewith and substantially perpendicular to the axes of the hollow cylindrical sections, the circumference of the inner surface of the hollow cylindrical section adapted to be fitted to the servo motor, being smaller than the outer circumference of the servo motor, the circumference of the inner surface of each of the other hollow cylindrical sections being smaller than the outer circumference of the servo component to which it is fitted, the hollow shell being adapted to be stretched over the portion of the servo motor, and the auxiliary servo components, projecting beyond the base plate, when the hollow shell is fitted thereto, the upper end of the hollow cylindrical section adapted to be fitted to the servo motor having a substantially circular top section integral therewith, the top section being adapted to engage the upper end of the servo motor, the upper end of each of the other hollow cylindrical sections having a substantially circular top section integral therewith, each circular top section being adapted to engage the upper end of the mating auxiliary servo component, the hollow shell including a base section integral with the open lower end of the hollow cylindrical sections, and substantially perpendicular to the axes of the hollow cylindrical sections, the base section being adapted to engage the surface of the base plate directed toward the servo components.

References Cited in the file of this patent
UNITED STATES PATENTS

| | | |
|---|---|---|
| 1,812,748 | Kayser | June 30, 1931 |
| 2,236,956 | Van Der Heem | Apr. 1, 1941 |